United States Patent [19]

Watson

[11] 4,006,202
[45] Feb. 1, 1977

[54] POLYMER COMPOSITION
[75] Inventor: James M. Watson, Big Spring, Tex.
[73] Assignee: Cosden Oil & Chemical Company, Big Spring, Tex.
[22] Filed: Oct. 2, 1972
[21] Appl. No.: 294,015
[52] U.S. Cl. .......................... 260/880 R; 260/4 AR
[51] Int. Cl.² ........................................ C08L 9/06
[58] Field of Search ................... 260/79.3 A, 880 R

[56] References Cited
UNITED STATES PATENTS

| | | | |
|---|---|---|---|
| 2,572,185 | 10/1951 | Noether | 260/79.3 |
| 2,625,525 | 1/1953 | Lynch | 260/79.3 |
| 3,242,231 | 3/1966 | Graham | 260/79.3 |

FOREIGN PATENTS OR APPLICATIONS 152,589   7/1953   Australia ........................ 260/79.3

*Primary Examiner*—Paul R. Michl

[57] ABSTRACT

A new polymer composition which is a terpolymer of styrene, an elastomer and $SO_2$, and the process for the manufacture of such terpolymer. The terpolymer composition of the present invention is one comprised of 64 to 98% by weight styrene copolymerized with 1 to 12% by weight of an elastomer and 1 to 24% by weight $SO_2$.

12 Claims, No Drawings

POLYMER COMPOSITION

BACKGROUND OF THE INVENTION

The present invention relates to improved synthetic thermoplastic resins. More particularly, the present invention relates to synthetic thermoplastic resinous compounds comprising terpolymers of styrene, sulfur dioxide, and an elastomer.

Polystyrene is one of the more versatile and widely used polymers available today. However, for many utilities, it is desirable to modify certain properties of polystyrene. This is generally accomplished by copolymerization of styrene with other materials. A particularly useful such material is the impact polystyrene which results from copolymerization of styrene and a polybutadiene rubber. Among the properties of polystyrene and, for that matter, many of its copolymers such as the impact polystyrene, which it is frequently desirable to modify are its softening point, its resistance to heat and its resistance to solvent attack.

It has been proposed in U.S. Pat. No. 2,572,185 to prepare a copolymer of sulfur dioxide and styrene. such copolymers have significantly increased heat resistance over the polystyrene alone. However, it has been found that such copolymers are not as readily moldable as would be desired. In fact, such copolymers are somewhat brittle.

It is an object of the present invention to provide a new and improved polymer composition.

Another object of the present invention is to provide a new thermoplastic terpolymer having improved properties.

Still another object of the present invention is to provide a new styrenic thermoplastic terpolymer having substantially improved heat and solvent resistance.

A remaining object of the present invention is to provide a process for the production of a new moldable styrenic terpolymer having improved properties.

Additional objects will become apparent from the following description of the invention herein disclosed.

SUMMARY OF THE INVENTION

The present invention which fulfills these and other objects, is a new polymer composition which is a terpolymer of styrene, an elastomer and $SO_2$, and the process for the manufacture of such terpolymer. The terpolymer composition of the present invention is one comprised of 64 to 98% by weight styrene copolymerized with 1 to 12% by weight of an elastomer and 1 to 24% by weight $SO_2$. This polymer is prepared by the copolymerization of styrene monomer, elastomer and $SO_2$ at a temperature within the range of 0° to 90° C. The copolymerization may be carried out with or without added catalyst since the $SO_2$ will itself catalyze the reaction as well as being one of the reactants.

The styrene-elastomer-$SO_2$ terpolymer of the present invention is moldable, and is highly resistant to solvent attack. Further, this polymer has an advantageously higher softening point than conventional styrene-elastomer copolymers.

DESCRIPTION OF THE PREFERRED EMBODIMENTS

In the practice of the present invention, the elastomer generally is dissolved in the styrene monomer. The $SO_2$ is then introduced into contact with the styrene monomer and elastomer. Most often, the styrene within the terpolymer will be within the range of 64 to 98% by weight of the terpolymer. The amount of elastomer generally will be within the range of 1 to 12% by weight. $SO_2$ usually is present in an amount within the range of 1 to 24% by weight of the starting mixture. In a particularly useful embodiment of the present invention, the amount of styrene will be within the range of 75 to 95% by weight, preferably 80 to 93% by weight, of the styrene elastomer-$SO_2$ terpolymer, with the elastomer accounting for 5 to 12% by weight; preferably 6 to 10% by weight of said terpolymer and the $SO_2$ accounting for 1 to 15% by weight, preferably 1 to 10% by weight of said terpolymer.

Among the elastomers employed in preparing the terpolymers of the present invention can be any of a variety of elastomers such as natural rubber, synthetic rubber, rubbery copolymers of ethylene and propylene, polyisobutylene, polyisoprene, polybutadiene, copolymers of butadiene and styrene, copolymers of butadiene and acrylonitrile, or copolymers of butadiene and methyl isopropenyl ketone. In a preferred embodiment of the present invention, the elastomers employed are the synthetic butadiene polymers such as homopolymers of butadiene and copolymers of butadiene and styrene known to the art and commonly used as toughening agents for making high impact styrene polymers. A particularly preferred such elastomer is one of those prepared by the polymerization of butadiene in the present of an alkyl lithium catalyst, particularly butyl lithium.

Exemplary of such preferred elastomers are stereospecific polybutadiene rubbers marketed by Firestone Tire and Rubber Company under the designations diene 35 and diene 55.

The terpolymer of the present invention is prepared through polymerization of the styrene, elastomer and $SO_2$ at a temperature with the range of 0° to 90° C. Preferably, however, the temperature employed will be within the range of 30° to 70° C. The pressures employed for carrying out this polymerization include subatmospheric, atmospheric or superatmospheric pressures up to 100 psig and higher. The preferred pressure will be within the range of 30 to 70 psig.

The polymerization reaction for the preparation of the present terpolymer composition may be carried out in bulk, in solution, in suspension, or in emulsion form by employing suitable emulsifying agents. Means for carrying out these various reactions are well known to the art, it being only necessary that the components and reaction conditions herein defined be employed in carrying out such reactions.

As indicated above, the $SO_2$ itself will act as a catalyst. However, if the $SO_2$ is to be employed as a catalyst as well as a reactant, it generally will be used in an excess over the above defined quantities for $SO_2$. Other well known polymerization catalysts may be employed if desired. However, particularly useful are the peroxides, i. e., dibenzoyl peroxide, lauryl peroxide, 2,4-dichlorobenzoyl peroxide, and the like; bis(4 tert.-butyl cyclohexyl)peroxy dicarbonate, etc. The preferred catalyst for preparing the terpolymers of the present invention are dibenzoyl peroxide and such catalysts as those having a half-life of less than 10 hours at 40°– 80° C such as bis(4 tert.-butyl cyclohexyl)peroxy dicarbonate and 2,4-dichlorobenzoyl peroxide. When employing these catalysts, they would generally be used in amounts of 0.1 to 1.0% of the styreneelastomer-$SO_2$ polymerization mixture.

In order to more specifically describe and define the present invention, the following examples are presented. These examples are presented for the purpose of illustration and are not to be construed as limiting the present invention.

EXAMPLE 1

A diene rubber marketed commercially by the Firestone Company and identified as Diene 35 (3 grams) was dissolved in 47 grams of styrene monomer. $SO_2$ (27 grams) was condensed into a pressure vessel and the styrene-diene rubber solution added thereto along with 0.20 grams of dibenzoylperoxide. The resulting mixture was agitated for approximately 30 minutes to assure complete dissolution of the components of the mixture. The reaction mass was then brought to a temperature of approximately 55° C for a period of time and then brought to a temperature of 70° C to bring about complete reaction. The temperature of 70° C was maintained for approximately 4 hours. The resulting polymer was removed from the pressure vessel and pulverized to a granular form. This polymer was found to soften about 220° C and to be insoluble in either paradioxane or DMF. It was slightly soluble in HMPA and very slightly soluble in hot DMSO. It was completely insoluble in hot toluene, benzene, heptane, cyclohexane and tetralin. The vicat softening point was determined to be 292° F. This polymer contained 12% by weight $SO_2$ and was found to be moldable.

EXAMPLE 2

To 312 grams of styrene monomer was added 18.7 grams of the diene rubber of Example 1 above. This mixture was agitated to bring about the dissolving of the diene rubber into the styrene monomer. $SO_2$ (119 grams) was condensed into a 2 liter Parr reactor. To this was added 0.5 grams of dibenzoyl peroxide and the styrene-diene rubber solution. In addition, 350 milliliters (approximate 270 grams) of cyclohexane were introduced into the reactor. The reactor was sealed and agitation and heating commenced. The reaction was carried on for twenty-six hours during which period the temperature ranged between 50 and 80° C with the majority of the period being at 50° to 60° C. Pressures ranged from 40 to 60 psig during most of the reaction period. Upon completion of the run, the resulting polymer was recovered and pulverized into granular form. This polymer was determined to contain approximately 12% $SO_2$. The solubility characteristics of the polymer were substantially the same as those of the polymer produced in Example 1 above. The vicat softening point was determined to be 294° F.

EXAMPLE 3

To 312 grams of styrene monomer was added 31.2 grams of the diene rubber of Example 1 above. After dissolving the diene rubber in the styrene monomer, the mixture was added to 131 grams of condensed $SO_2$ in a reaction vessel. To this mixture was added 0.5 grams of dibenzoyl peroxide, 0.05 grams of lecithin and 700 ml. of cyclohexane. The reactor was sealed and heating and agitation commenced. The temperature was raised to 55° C with a pressure of 50 psig. The reaction was carried on for a period of 28½ hours during which time the temperature fluctuated between 50° and 70° C and the pressure between 35 and 80 psig. During the majority of the run, however, the temperature was maintained between 50° and 60° C and the pressure between 35 and 45 psig. Upon completion of the run, the polymer was recovered. This polymer was found to contain 13.8% $SO_2$. The solubility characteristics of this polymer were substantially similar to that of the polymer prepared in accordance with Example 1. This polymer has a vicat softening point of 300+° F. In addition, this polymer is found to be completely moldable.

EXAMPLE 4

To 312 grams of styrene monomer was added 18.7 grams of diene rubber produced by the Firestone Company and identified as Diene 55. After the diene rubber became dissolved in the styrene monomer, the mixture was introduced into a reactor containing 128 grams of condensed $SO_2$. The reactor also contained 0.05 grams of lecithin, 0.5 grams diabenzoyl peroxide and 700 ml. of cyclohexane. The reactor was sealed and agitation and heating commenced. The reactor was heated at a temperature of 50° C and raised to a pressure of 55 psig. The reaction was carried on for 28 hours during which time the temperature fluctuated from the initial 50° C to as high as 90° C. However, throughout the first 24 hours of the run, the temperature was maintained between 50 and 55° C. The pressure during the reaction fluctuated from the initial 55 psig. to as low as 35 psig. and as high as 100 psig. However, during the first 24 hours of the reaction, the pressure was maintained between 35 and 55 psig. Upon completion of the reaction, the polymer was recovered. This polymer was found to contain 12.8% $SO_2$. The solubility characteristics of the polymer were substantially the same as those of the polymer produced in Example 1 above. This polymer is found to have a vicat softening point of 298° F. In addition, this polymer was found to be very homogeneous and tough and is completely moldable.

EXAMPLE 5

The diene rubber of Example 4 was dissolved in three mols of styrene monomer such as to produce a 6% by weight concentration of the diene rubber. This mixture was then introduced into a reactor containing 0.87 mols of $SO_2$. To the reactor was added 0.5 grams of dibenzoyl peroxide, 0.05 grams lecithin and 350 ml. of cyclohexane. The reactor was sealed and agitation and heating commenced. Reaction was continued for 24 hours with temperature being maintained at approximately 70° C during most of the period. Upon completion of the reaction, the polymer was recovered and found to contain 2.8% $SO_2$. The solubility characteristics of the polymer were substantially the same as those of the polymer produced in the above examples. This polymer was found to be very homogeneous and tough and is very moldable.

I claim:

1. A copolymer comprised of 64 to 98% by weight of styrene and 1 to 24% by weight of $SO_2$ homogeneously copolymerized with 1 to 12% by weight of an elastomer, said copolymer being prepared by copolymerizing said styrene and said $SO_2$ in the presence of an elastomer dissolved in said styrene at a temperature of between 0 and 90° C.

2. The copolymer of claim 1 comprised of 75 to 95% by weight of styrene and 1 to 15% by weight $SO_2$ homogeneously copolymerized with 5 to 12% by weight of elastomer.

3. The copolymer of claim 1 comprised of 80 to 93% by weight of styrene and 1 to 10% by weight $SO_2$ homogeneously copolymerized with 6 to 10% by weight of an elastomer.

4. The copolymer of claim 1 wherein the elastomer is one prepared by the polymerization of butadiene in the presence of an alkyl lithium catalyst.

5. The copolymer of claim 4 wherein the elastomer is one prepared by the polymerization of butadiene in the presence of a butyl lithium catalyst.

6. A process for preparing styrenic polymer consisting essentially of copolymerizing styrene monomer, an elastomer dissolved in said styrene monomer and $SO_2$ at a temperature within the range of 0° to 90° C.

7. The process of claim 6 wherein the polymerization temperatures are within the range of 30° to 70° C.

8. The process of claim 6 wherein said polymerization is carried out in the presence of a polymerization catalyst.

9. The process of claim 6 wherein the polymerization is carried out on the presence of a peroxide polymerization catalyst.

10. The process of claim 6 wherein said catalyst is dibenzoyl peroxide.

11. The process of claim 6 wherein said polymerization is carried out in the presence of a polymerization catalyst selected from the group consisting of bis(4 tert.-butyl cyclohexyl) peroxy dicarbonate and 2,4 dichlorobenzoyl peroxide.

12. The process of claim 8 wherein the amount of catalyst employed is within the range of 0.1 to 1% by weight of the styrene-elastomer-$SO_2$ polymerization mixture.

* * * * *